United States Patent [19]
Johnson

[11] 3,892,255

[45] July 1, 1975

[54] INLET ORIFICE DEVICE TO CONTROL THRUPUT FLOW FOR PRESSURE REGULATORS

[75] Inventor: Dwight N. Johnson, Anaheim, Calif.

[73] Assignee: The Singer Company, New York, N.Y.

[22] Filed: Dec. 19, 1973

[21] Appl. No.: 426,294

[52] U.S. Cl. ........ 137/116.5; 137/504; 137/505.15; 137/505.46

[51] Int. Cl. ............................................ G05d 16/18

[58] Field of Search ... 137/505.15, 613, 504, 116.5, 137/505.46

[56] References Cited
UNITED STATES PATENTS

| | | | |
|---|---|---|---|
| 3,207,175 | 9/1965 | Pauly | 137/505.46 |
| 3,425,442 | 2/1969 | Johnson | 137/505.46 X |
| 3,576,193 | 4/1971 | Rothfuss | 137/613 X |
| 3,809,108 | 5/1974 | Hughes | 137/505.46 X |

Primary Examiner—Harold W. Weakley
Attorney, Agent, or Firm—Marshall J. Breen; Chester A. Williams, Jr.; Harold Weinstein

[57] ABSTRACT

An inlet orifice device to control thruput flow for a pressure regulator, and to prevent increases in inlet pressure from causing variations in outlet pressure. The novel inlet orifice device also permits improved relief valve performance by limiting the maximum available thruput flow to constant levels, within the design range of inlet pressure, regardless of the variation of the inlet pressure supplied within such range.

The improved inlet orifice device serves the dual function of controlling the thruput flow by (1) varying the open area (flow limiter area) on the inlet side of the pressure regulator thru the said device and (2) cooperating with the valve to vary the open area (throttling area) on the outlet side of the said device. The improved inlet orifice device includes a fixed nozzle on the inlet side and a control member moveable relative the nozzle and the valve, which valve is disposed on the outlet side and actuated responsive the diaphragm.

8 Claims, 11 Drawing Figures

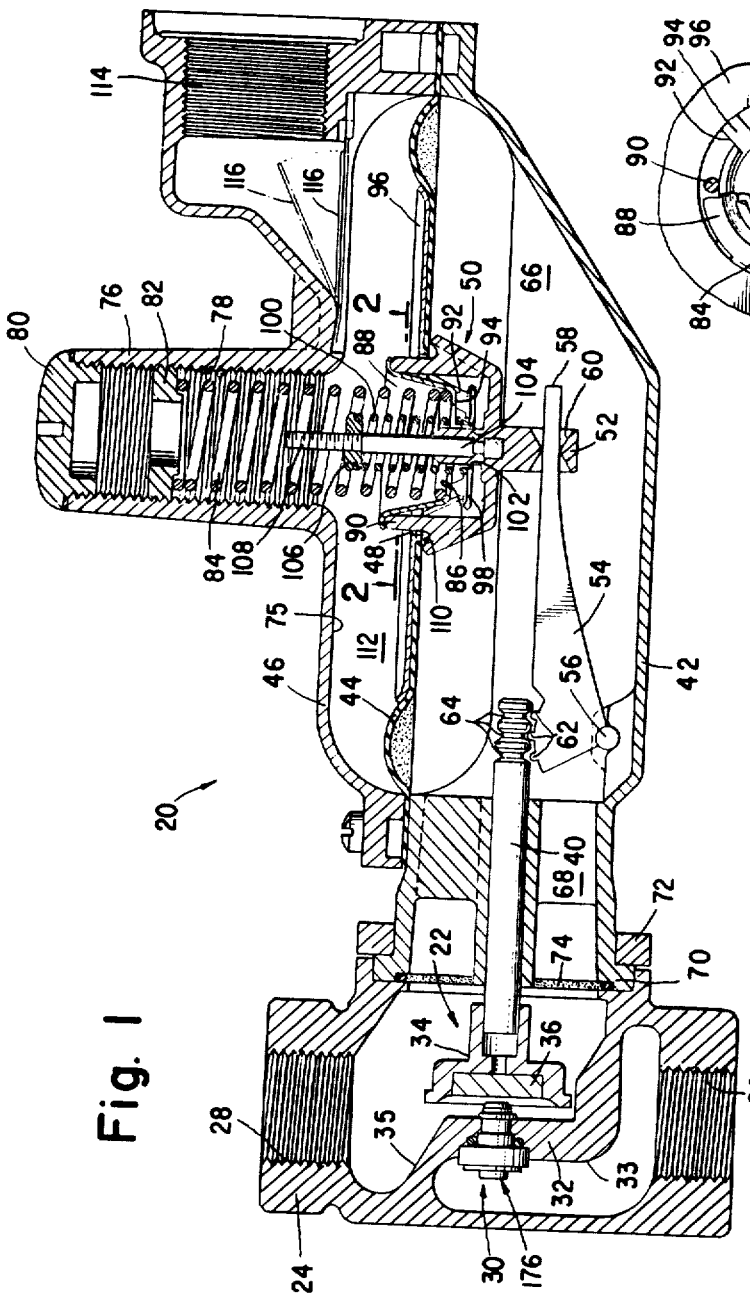
Fig. 1
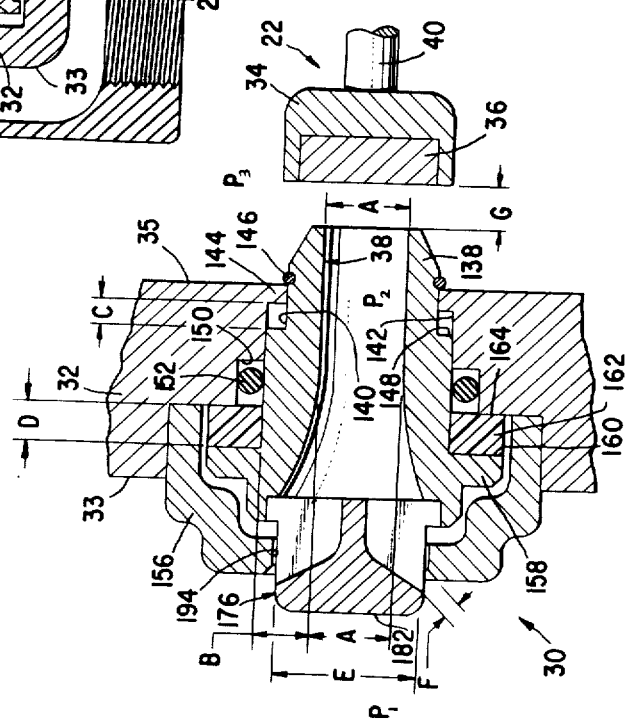
Fig. 2
Fig. 3

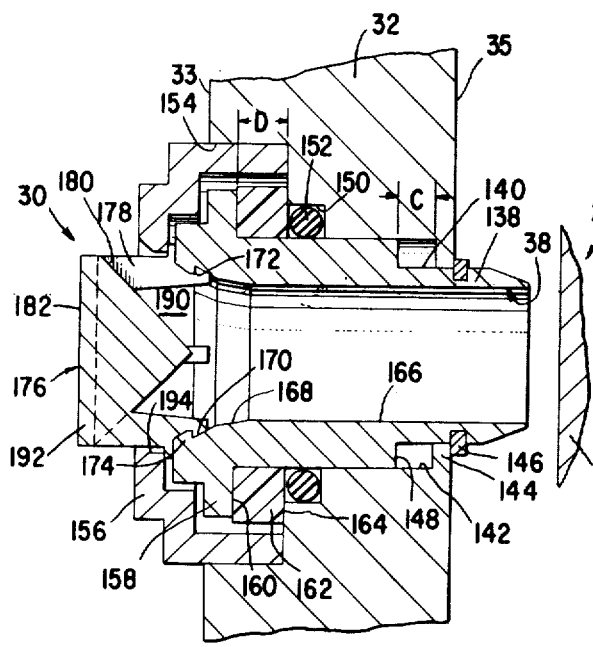
Fig. 4
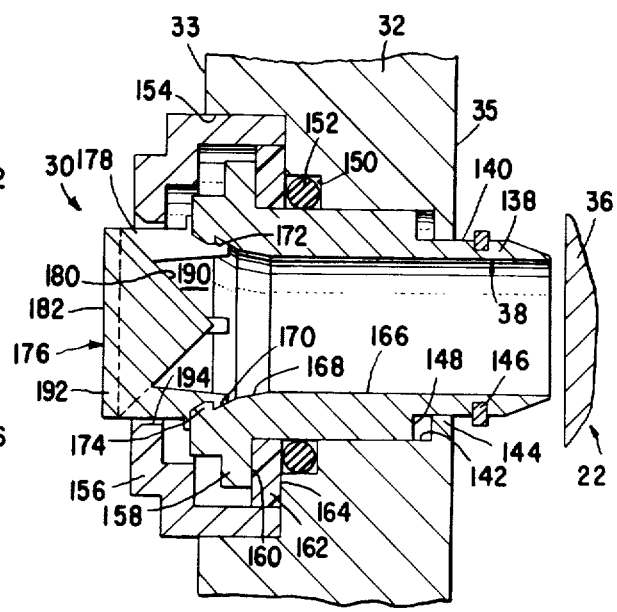
Fig. 5
Fig. 6
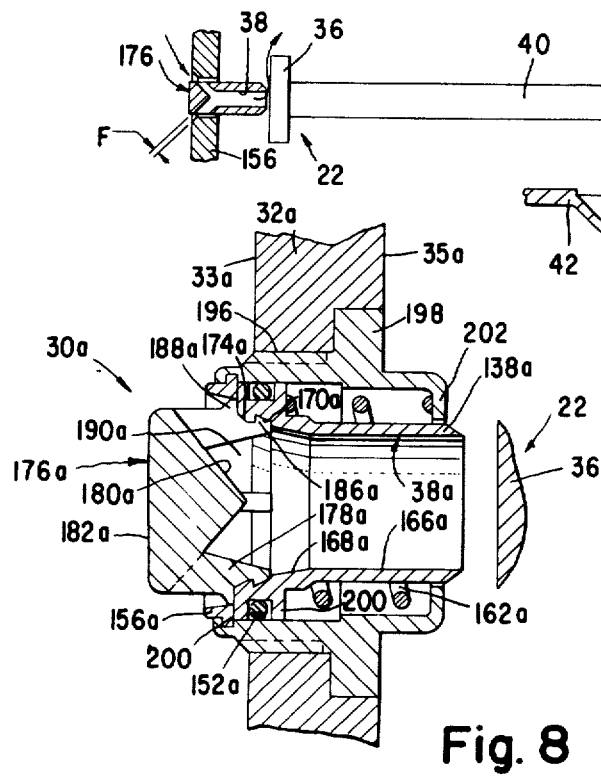
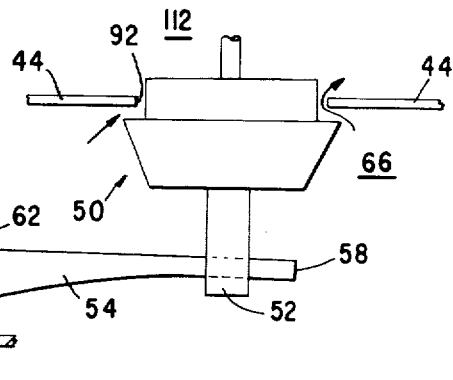
Fig. 8
Fig. 7
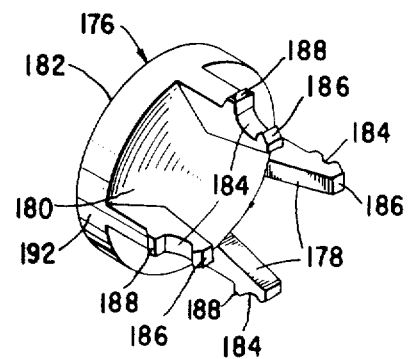

— 1.5 PSI INLET PRESSURE
---- 45 PSI INLET PRESSURE
—·— 23 PSI INLET PRESSURE

INCHES WATER OUTLET PRESSURE

FLOW CUBIC METER/HOUR

OUTLET PRESSURE

INLET PRESSURE 3,892,255

INLET ORIFICE DEVICE TO CONTROL THRUPUT FLOW FOR PRESSURE REGULATORS

CROSS REFERENCE TO RELATED U.S. PATENTS

U.S. Pat. No. 3,425,442, Feb. 2, 1969, D. N. Johnson et al. "Pressure Regulator".

BACKGROUND OF THE INVENTION

Heretofore, in pressure regulators of the prior art variations in the inlet pressure, either would affect outlet pressure and prevent attaining a constant value, or in the event of operation of the relief valve no provision was made to limit increases in thruput flow due to increases in the inlet pressure. The latter led to buildup of excessive outlet pressure resulting in an unsafe condition.

SUMMARY OF THE INVENTION

It is an object of the present invention to provide an improved inlet orifice device for pressure regulators which overcomes the disadvantages of the prior art; which is simple, reliable and economical; which enhances attainment of a more constant outlet pressure regardless of either variable orifice flow rates or variable inlet pressures; which provides a variable flow limiter area; which provides a variable inlet opening formed on the inlet side of the pressure regulator that changes responsive to the inlet pressure to control the inlet thruput flow therein; which suppresses outlet pressure variations caused by fluctuating inlet pressure values; and, which improves relief valve performance by limiting the maximum available thruput flow to constant levels regardless of supplied inlet pressure values.

Other objects and advantages will be apparent from the following description of several embodiments of the invention, and the novel features will be particularly pointed out hereinafter in the claims.

BRIEF DESCRIPTION OF THE DRAWINGS

This invention is illustrated in the accompanying drawings in which:

FIG. 1 is a sectional elevational view showing one of the preferred embodiments of the present invention.

FIG. 2 is a top plan view taken along line 2—2 of FIG. 1.

FIG. 3 is a diagrammatic elevational view showing a comparative representation of component spacings for the present invention.

FIG. 4 is an enlarged elevational view at the inlet, showing the present invention in one condition of operation.

FIG. 5 is an enlarged elevational view at the inlet showing the present invention in another condition of operation.

FIG. 6 is a diagrammatic representation showing the inlet, main valve assembly, and relief valve assembly to the diaphragm, wherein the relief valve is operative.

FIG. 7 is a perspective view of a flow limiter poppet of the present invention.

FIG. 8 is an elevational view of another preferred embodiment of the present invention.

DESCRIPTION OF THE INVENTION

Figure 9:
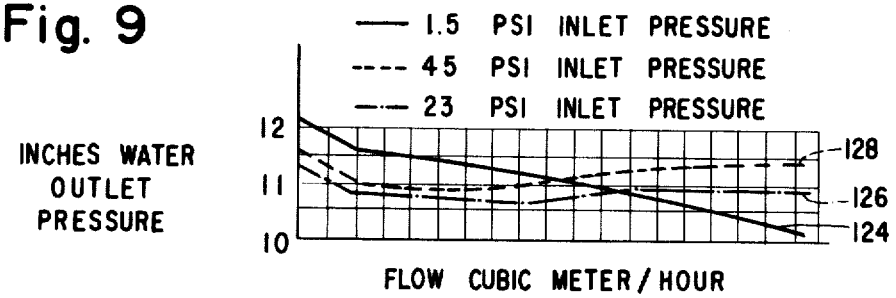
FIG. 9 is a diagram of output pressure compared to rate of flow for selected input pressures.

In the embodiment of the invention illustrated in FIGS. 1 through 7, the pressure regulator, generally designated 20, includes a main valve assembly 22 positioned in a housing 24. The housing 24 illustrated in FIG. 1 is provided with an inlet 26 and an outlet 28, and the main valve assembly 22 controls the thruput flow in the pressure regulator 20 from the inlet 26 to the outlet 28. The novel inlet orifice device, designated generally 30, may be conveniently described as an elevation, compensation and limitation, i.e. "E.C.L.", orifice device. The inlet orifice device 30 is mounted in the inlet 26 in a transverse wall 32 which separates the inlet 26 from the outlet 28. The inlet orifice device 30 constitutes an improved part of the main valve assembly 22, and will be described more fully hereinafter. A movable valve element 34 includes a nonmetallic disc 36; is urged toward or away from engagement with the orifice 38 of the device 30 shown in FIGS. 4 and 5. The valve element 34 is fixed to a valve stem 40 slidably mounted in a body 42.

The outer periphery of a flexible diaphragm 44 illustrated in FIG. 1 is clamped between mating surfaces of the body 42 and a bonnet 46. The flexible diaphragm 44 is annular in shape, and is provided with a central opening 48. A relief valve assembly generally designated 50, is mounted in this opening, and this assembly includes a relief valve head 52. A lever 54 pivotally supported on the body 42 at 56, has an extension portion 58 projecting through a slot 60 provided on the relief valve head 52. Gear teeth 62 on the lever 54 engage in annular grooves 64 on the stem 40, so that pivotal movement of the lever 54 causes corresponding reciprocating movement of the stem 40 and movable valve element 34.

A chamber 66 is formed within the body 42 below the flexible diaphragm 44 in communication with the outlet 28 through passages 68 wherein the diaphragm 44 will be loaded or its underside by the outlet pressure. The body 42 is connected to the housing 24 by means of mating circular flanges 70 and a clamp ring 72. Fasteners, not shown, serve to connect the clamp ring 72 to the housing 24. A seal ring 74 prevents leakage between the body 42 and the housing 24.

The bonnet 46 shown in FIG. 1 has a flat portion, with an undersurface 75, which extends into a central upwardly projecting tubular portion 76 provided with internal thread 78 and closed by a threaded cap 80. An adjusting nut 82 engages the thread 78 and contacts the upper end of a load spring 84. The load spring 84 is a coil compression spring and the lower end thereof engages a shoulder 86 on an annular spring cup 88 through which the upperside of the diaghragm 44 is loaded. The spring cup 88 comprises a portion of the relief valve assembly 50, and the upper end of the spring cup 88 rests on a plurality of posts 90, formed integrally with the relief valve head 52. Each of these posts 90 projects though an aperture 92 formed in a frustoconical central portion 94 of a diaphragm stiffener 96, as illustrated in FIGS. 1 and 2. This portion of the diaphragm stiffener 96 extends downward through the central opening 48 in the flexible diaphragm 44. A central end wall 98 of the stiffener 96 extends under the shoulder 86 to provide a support for the lower end of a relief valve spring 100. The end wall 98 has a central opening 102 to which a portion of the valve head 52 and an integral stem 104 extend. The adjusting nut 106 engages the threaded portion 108 of the stem 104 and engages the upper end of the relief valve spring 100.

A rim 110 on the relief valve head 52 is depicted in FIG. 1 engages a portion of the undersurface of the flexible diaphragm 44 to form a seal. When the diaphragm 44 moves upward away from the valve head, as described hereinafter, gas may flow through the opening between the rim 110 and the underside of the diaphragm 44, through the aperture 92 and into space 112 above the diaphragm 44 and within the bonnet 46. Gas escapes from the space 112 to a vent connection 114 provided in the bonnet 46. If desired, a check valve 116 of the flexible flapper type may be employed which normally acts to prevent return flow from the vent connection 114 to the space 112, but which opens under very low differential pressure to vent the space 112 through the vent connection 114.

The adjusting nut 82 may be turned by means of a tool, not shown, inserted into the tubular portion 76 of the bonnet 46, in the absence of cap 80. Another tool, not shown, may be inserted through the central opening in the nut 82 for adjusting the nut 106 on the stem 104.

The diaphragm 44 and the spring 84 constitute control means responsive to the pressure in the chamber 66. In operation, the diaphragm 44 illustrated in FIG. 1 moves up or down until the outlet pressure in the chamber 66 on the undersurface of the diaphragm reaches equilibrium with the spring pressure on the upper side of the diaphragm. The flow of gas through the inlet orifice device 30 is controlled responsive to movement of the diaphragm 44. As the outlet pressure falls, the diaphragm 44 moves downwardly, moving the valve element 34 away from the orifice 38. This admits the larger amount of gas required to maintain the outlet pressure. Though reference in this description is made to "gas" it will be understood that the scope of this invention is broad enough to be applied to any fluid.

Figure 10:
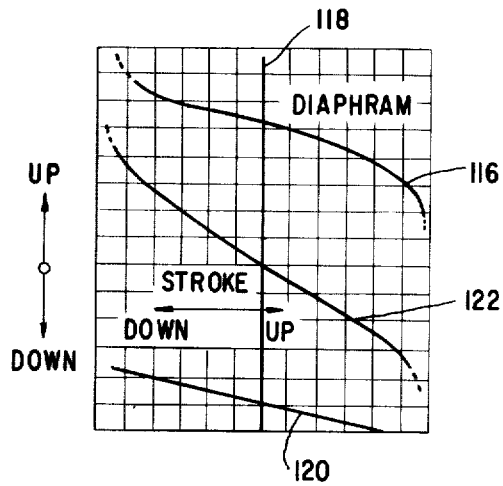
FIG. 10 is a diagram of the forces in the regulator.

There are several factors which affect the operation of the pressure regulator 20. First, at constant outlet pressure, the upward force exerted by the diaphragm 44 varies in accordance with the daiphragm position as indicated by the curve 116 in FIG. 10. As compared to a central position indicated by the line 118, the upward force exerted by the diaphragm 44 at constant outlet pressure increases as the diaphragm moves downward. This is characteristic of diaphragms. Second, the downward force exerted by the spring 84 also varies with the diaphragm position as indicated by the curve 120 in FIG. 10. The resultant or net force exerted on the diaphragm 44 at constant outlet pressure varies with the diaphragm position as indicated by the curve 122 in FIG. 10, which is the sum of the curves 118 and 120. The curve 122 shows the force applied to the main valve assembly 22. Third, the gas pressure at the inlet 26 is applied to the central area of the valve disc 36, producing a thrust directly proportional to the inlet pressure. The position of the valve element 34 with respect to the orifice 38 of the inlet orifice device 30, accordingly, does not depend solely upon the outlet pressure, but rather, is due to the balance between the downward forces exerted by the spring 84 and the valve element 34 against the upward forces exerted by the diaphragm 44 so that as the inlet pressure rises, the outlet pressure has a corresponding increase.

Through the use of the improved inlet orifice device 30, it is possible to stabilize the outlet pressure over a wide range of varying conditions to a greater extent than was possible in prior art regulators, with one of the variable being changes in the inlet pressure. This result is apparent form the diagrams shown in FIGS. 9 and 11. FIG. 9 is an example of the effect of changes in inlet pressure on the regulator performance, wherein curves 124, 126 and 128 show the variation in outlet pressure with flow for inlet pressure of 1.5 pounds per square inch, 23 pounds per square inch, and 45 pounds per square inch. Note that for each successive increase in the inlet pressure, the outlet pressure tends to remain more nearly constant. Thus, the use of the improved inlet orifice device 30 would eliminate the need for step down or double regulator installations in many applications where the inlet pressure is high. It also permits an increase in the regulator flow capacity through the use of larger diameter orifices and valve ports.

Figure 11:
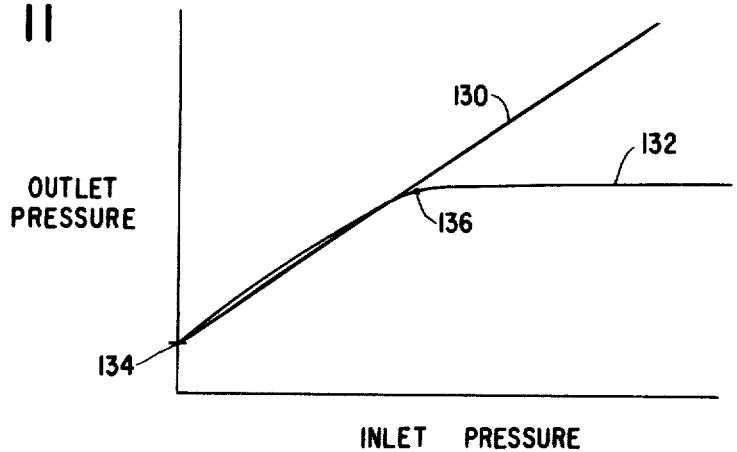
FIG. 11 is a diagram of inlet pressure versus oulet pressure of a regulator having the main valve assembly locked in a wide open position for a conventional pressure regulator and a pressure regulator embodying the present invention.

FIG. 11 is a comparative diagram in which curve 130 represents a conventional pressure regulator equipped with a relief valve and curve 132 represents the pressure regulator 20 equipped with a relief valve embodied with the improved inlet orifice device 30. In each instance, the main valve assembly of the respective regulators has been blocked wide open. The conventional regulator will have its outlet pressure increased directly proportional with the inlet pressure in a substantially straight line, as is shown by the curve 130. Contrast this with the pressure regulator 20 embodying the present invention wherein the curve 132 shows the rise of oulet pressure is directly proportional to the rise in inlet pressure only from a set point 134 to a limit point 136, after which increases in inlet pressure do not result in increases in outlet pressure, as represented by the horizontal portion of the curve 132. The improved inlet orifice device 30, for the reasons more fully explained hereinafter, provides for this dramatic leveling off of the outlet pressure which after the limit point 136 is reached remains substantially constant when coupled to the relief valve capacity, and thereby, preventing build-up of excessive pressure in the outlet side of the pressure regulator 20. Accordingly, the present invention provides for improving the performance of the relief valve assembly 50, by limiting the maximum available thruput flow to constant levels regardless of supplied inlet pressure values.

The inlet orifice device 30 illustrated in FIGS. 1, 4 and 5 has an orifice body 138, the central opening of which, defines the orifice 38. The outer periphery 140 is of reduced diameter on the inwardly facing end adjacent to the valve disc 36 as best seen in FIGS. 4 and 5. The body 138 slidingly engages a bore 142 formed in the wall 32 which has a radially inwardly extending projection or annular flange 144, at the end thereof adjacent the disc 36. The end of the body 138 which extens beyond the flange 144 is fitted with a retaining ring 146 spaced from an annular shoulder 148 which terminates the reduced diameter section, so that the axial travel of the body 138 is limited by the flange 144 being engaged by the shoulder 148 on the one side, and the ring 146 on the other side. The orifice 138 extends through the wall 32 from the inlet side 33 to the outlet side 35 thereof.

The wall 32 at the bore 142, has a counterbore 150 which receives an "0" ring 152 to provide sealing engagement between the wall 32 and the body 138, thus preventing any gas leaks therethrough. A second counterbore 154 in the wall 32 is illustrated in FIGS. 4 and 5, has a flow limiter nozzle 156 affixed therein. Of course wall 32 can receive any conventional orifice but when it is fitted with the improved inlet orifice 30, it becomes an integral part of said device.

The body 138 has an annular flange 158 extending from the periphery 140 a short distance in from the end thereof opposite the end carrying the ring 146. The undersurface 160 of the flange 158 engages an orifice spring 162 which is entrapped between the surface 160 and a shoulder 164 formed in the wall 32 adjacent the 0 ring 152. The spring 162 is depicted as being a polomeric plastic material, but any suitable resilient material may be used such as a coil spring, a spring washer, or one of any number of other available plastic materials such as an elastomer, etc.

The orifice 38 of the body 138 has section 166 of substantially uniform diameter which extends from the end adjacent the disc 36 towards the opposite end to terminate in a radially outwardly flared section 168 of increasing diameter in the direction away from the disc 36 which terminates at the opposite end of the orifice 38. An annular groove 170 is formed inwardly of the end in the flared section 168, and has one wall sloped radially outwardly toward the end of the section 168 to terminate in a shoulder 172 therein. The shoulder 172 defines one side of an inwardly facing radial annular flange 174 formed adjacent the end in the flared section 168. The flared section 168 defines an orifice piston described more fully in connection with FIG. 3 wherein the reference character "B" is equivalent to section 168.

A flow limiter poppet 176 is carried by the body 138 at the end thereof opposite the disc 36. The poppet 176 has a plurality of legs 178 which extend from a conical surface 180 in the axial direction spaced from the center thereof. The conical surface 180 is sloped to extend radially inwardly toward the center in the same direction as the legs 178. The outer face 182 of the poppet 176 is flat and regular. The outer periphery of the ends of the legs 178 is grooved as at 184, to define a pair of spaced fingers, with the outer finger 186 being short and the inner finger 188 being longer. On affixing the flow limiter poppet 176 to the body 138, the legs 178 are disposed within the orifice 38, whereby the flange 174 will engage the grooves 184 with the short fingers 186 snapped within the groove 170 and abutting the shoulder 172, and the long fingers 188 contracting the outer surface, thus, locking the poppet 176 in axial position. Once the poppet 176 is connected to the body 138, it will move in unison with the body 138. A flow passage 190 is formed between the conical surface 180 and the orifice 38, including the flared section 168, and the regular diameter section 166 as illustrated in FIGS. 4 and 5. The poppet 176 has a short conical surface 180 and the face 182. The diameter of the face 182 is a smaller dimension than the circular opening 194 of the flow limiter nozzle 156, which opening 194 is adjacent to and aligned with the passage 190 when the body 138 is in the leftmost position shown in FIG. 4 or adjacent the periphery 192 when the body 138 is increasingly shifted rightwardly in the position shown in FIG. 5. The opening 194 has a chamfered surface sloped corresponding to the slope of the conical section 180, and similar to the slope of the flange 174, so as to provide a smooth flow path for the gas entering the passage 190 from the inlet 26. The poppet 176 comprises a body piston described more fully in connection with FIG. 3 wherein the reference character "E" which is equivalent to the body piston.

One form of an operative feature of the present invention was included in U.S. Pat. No. 3,425,442, relating to suppressing outlet pressure variations caused by fluctuating inlet pressure values. This feature will be briefly discussed herein in connection with FIGS. 4 and 5. In order to prevent unwanted increase in outlet pressure due to increased inlet pressure, the orifice body 138 is movably mounted within the bore 142 of the wall 32. The flared section 168 defines an annular piston-like area which constitutes a differential area responsive to the inlet pressure in the pressure regulator 20. This differential area is generally designated "B" in FIG. 3. The inlet pressure acts on the flared section 168 of the orifice body 138 exerting a force proportional to the inlet pressure tending to move the orifice body 138 toward the right, as shown in FIG. 4 against the orifice spring 162, which in the preferred embodiment may be assumed to be made of a polomeric plastic mateial. The orifice spring 162 is mounted between the surface 160 of the body 138 and the shoulder 164 of the wall 32. In FIG. 4, the orifice 38 of the body 138 is shown in the position it normally occupies at low inlet pressure, for example, 5 pounds per square inch. As the inlet pressure increases, the orifice 38 moves to the right, as shown in FIG. 5, relative to the wall 32 and in order to maintain the gas flow, the valve element 22 also has a corresponding movement to the right which causes a downward movement of the diaphragm 44. The lower position or attitude of the diaphragm 44 causes a greater force for the same differential pressure as indicated by the curve 122, depicted in FIG. 10. Since the increase in inlet pressure causes an increase in valve thrust, in opposition to the increased force exerted by the diaphragm 44, the forces tend to cancel out and make the operation of the pressure regulator 20 less dependent of the inlet pressure.

In order to better understand the present invention, it is necessary to examine the diagrammatic illustration of FIG. 3, which depicts a comparative representation of component spacing of the inlet orifice device 30 and associated components. The inlet orifice device 30 is provided with a positive secondary stop in the form of shoulder 148, to control the orifice stroke to precise limits. With the orifice body 138 in its low inlet pressure position, or leftward position, as shown in FIGS. 3 and 4, the retaining ring 146 will abut the outer edge of flange 144 to establish a maximum dimension between the inner end of the flange 144 and the shoulder 148 which is shown in FIG. 3 by the axial distance "C". The C dimension determines the stroke capabilities of the inlet orifice device 30 and is sufficiently smaller than the axial length of the orifice spring 162, shown in FIG. 3 by the reference character "D", to prevent overstressing of the orifice spring 162 even if the inlet orifice device 30 is subjected to inlet pressure greater than the rated capacity thereof. As the inlet pressure increases, the orifice body 138 will increasingly shift rightward, as shown in FIG. 5 until the shoulder 148 abuts the flange 144 to reduce the C dimension to zero, while the D dimension still has sufficient axial length to prevent overstressing of the orifice spring 162.

In conventional regulators, variations in the inlet pressure are accompanied by proportional variations in outlet pressure. This is attributable to the fact that the inlet pressure acts on the exposed area of the valve seat disc, so that any increase in inlet pressure results in an increase in the opening force acting on the valve seat disc which must be balanced by an increase outlet pressure under the diaphragm. The area of the valve seat disc exposed to inlet pressure in a conventional regulator, would be dependent on the orifice size, and therefore, could be likened to the area A depicted for the pressure regulator 20, as shown in FIG. 3, wherein the area at the disc exposed to the inlet pressure is equal to the cross-sectional area of the orifice 38 at the uniform diameter section 166.

The orifice body 138 of the inlet orifice device 30 illustrated in FIG. 3, includes an annular piston area B which is also represented in FIG. 4 as the flared section 168 of the orifice 38. The are B is responsive to inlet pressure changes and causes the orifice body 138 to move rightwardly, as represented in FIG. 5, toward the valve disc 36 whenever the inlet pressure increases. The amount of movement of the orifice body 138 is determined by the spring rate of the counteracting orifice spring 162. Orifice 38 travel towards the valve disc 36, decreases the throttling area "G" and the resulting flow rate through the pressure regulator 20. The throttling area G is measured from the rightmost end of the orifice body 138, as viewed in FIGS. 3 and 4, to the face of the valve disc 36. Any reduction in flow rate produces a corresponding reduction in regulator outlet pressure, thereby resulting in positioning the regulator diaphragm 44 at a lower attitute with an accompanying reduction in pressure spring force dependent upon the spring rate. This reduced outlet pressure compensates for the increased opening force of the valve disc 36 due to increased inlet pressure acting on area A of the valve disc 36. By careful selection of the two spring rates for the orifice spring 162 and the diaphragm load spring 84, nearly constant outlet pressure control can be obtained. Thus, the inlet orifice device 30 is able to effectively surpress outlet pressure variations.

The inlet orifice device 30 through the coaction of the flow limiter poppet 176 and the flow limiter nozzle 156, is capable of limiting the maximum thuput flow rate of the pressure regulator 20. The flow limiter area or inlet flow area, F shown in FIG. 3, is defined by the variable annular distance between the poppet 176 and the nozzle 156, as measured by hypothetical parallel lines projecting at an angle corresponding to the slope of the conical surface 180, with one of these lines extending from said surface 180 and the other line extending tangentical to the opening 194 of the nozzle 156. The flow limiter poppet 176 is affixed to and carried by the orifice body 138 to form an integral unit. As the inlet pressure increases, and acts on the annular piston area B, the orifice body 138 and the flow limiter poppet 176 move as a unit towards the valve disc 36, as illustrated in FIG. 5. This resulting movement decreases the flow limiter area F to introduce an increasing pressure drop into the system, as flow rate demand increases, resulting in a decreased variable pressure drop supplied to the regulator throttling area G. Precise control of the shape, size and dimensional features of the flow limiter poppet 176 and flow limiter nozzle 156, will result in establishing a ratio of areas, F and G, such that constant maximum available flow rate can be achieved in spite of fluctuating inlet pressures.

One design requirement that must be maintained in the inlet orifice device 30 for efficient operation of the pressure regulator 20 within an operative range of inlet pressure, for example, of between 0 pounds per square inch to 100 pounds per square inch, is that the poppet piston area E shown in FIG. 3 and represented by the area of the face 182, illustrated in FIGS. 4 and 5, must be equal to the orifice piston area B which corresponds to the flared section 168 shown in FIGS. 4 and 5. In other words, the areas B and E must be properly balanced in order to maintain a correct ratio of inlet pressure to orifice extension.

The necessity to balance the areas B and E depicted in FIG. 3, becomes evident when considering the effects of the induced pressure drop created by the flow limiter area, F, as flow increases through the pressure regulator 20. Assuming a constant inlet pressure, $P_1$, value during the following conditions and wherein:

"$P_1$" = inlet pressure
"$P_2$" = the pressure in the orifice 38
"$P_3$" = outlet pressure With minute flow rate demands, i.e., the throttling area G is much small than the flow limiter area F, essentially no pressure drop across poppet piston area E will exist, ($P_1 = P_2$), and full inlet pressure is exposed to the orifice piston area B. The inlet pressure will be thus impose a fixed load on the orifice spring 162, [$B(P_1-P_3)$], and a resulting given deflection of the orifice body 138 which must be maintained, regardless of flow rate, in order to maintain substantially constant outlet pressure $P_3$, while continuing to supress outlet pressure variations due to changes in inlet pressure, $P_1$, in addition to permitting the desired limiting effect to be firmly established. As flow rate increases, i.e., throttling area G increases, an increasing pressure drop, ($P_1 - P_2$), will be induced by flow limiter area F and imposed across poppet piston area E. Accordingly, this induced pressure drop will reduce the pressure drop, ($P_2 - P_3$), exposed to orifice piston area B. These two area-pressure drop relationships must cancel out each other to prevent orifice movement from destroying (1) the correct flow limiting effect established by flow limiter area F, and (2) pressure elevation compensation effects established by orifice movement toward the valve disc 36 for increasing inlet pressures. The necessary relationship stated mathematically is:

$$E(P_1 - P_2) + B(P_2 - P_3) = B(P_1 - P_3)$$

Conventional regulators are often equiped with relief valves. However, downstream protection from overpressurization is affected by changes of inlet pressure supplied to the regulator. As the inlet pressure rises, the available maximum outlet pressure buildup also increases due to the increased available flow rate through the conventional regulator. This increased flow rate, accordingly, is not carried off by the relief valve resulting in pressure buildup on the outlet side of the conventional regulator. One of the principal features of the present invention is to prevent such an overpressure condition in the outlet pressure from developing by providing the improved inlet orifice device 30, which includes the flow limiting feature. The coaction of the flow limiter poppet 176 and the flow limiter nozzle 156, through movement of the orifice body 138, produce a continuous adjustment of the flow limiter area F to prevent an increase flow through the flow limiter area F, regardless of the increase in the inlet pressure. Hence, virtually the same outlet pressure is delivered to chamber 66 for the whole range of minimum through maximum inlet pressure ratings for the pressure regulator 20. The relative position of the flow limiter poppet 176 with respect to the flow limiter nozzle 156, is responsive to the inlet pressure, so that for low inlet pressure, for example, 5 pounds per square inch, the orifice body 138 and the connected flow limiter poppet 176 will take a leftmost position as shown in FIGS. 3 and 4, to provide for the largest flow limiter area F. As the inlet pressure increases, the orifice body 138 will be moved increasingly rightwardly as shown in FIG. 5, to cause a corresponding reduction in the flow limiter area F.

In normal operation of the pressure regulator 20, gas under pressure is admitted through the inlet 26 and passes through the outlet 28 at a pressure determined by the force of the load spring 84. When the pressure at the outlet 28 and in the chamber 66 falls below a desired regulated outlet pressure, the spring 84 acting through the annular cup 88, posts 90 and valve head 52, moves the lever 54 about its pivot 66 in a clockwise direction, as viewed in FIG. 1. This causes movement of the stem 40 and the movable valve element 34 toward the right, thereby permitting gas to flow from the inlet 26 through the orifice 38 and to the outlet 28. If for any reason the pressure at the outlet 28 and in the chamber 66 should exceed the desired regulated outlet pressure, the pressure under the diaphragm 44 acts against the force of the load spring 84 to cause upward movement of the diaphragm 44 and the relief valve head 52 until the lever 54 moves the valve element 34 to close the valve disc 36 against the orifice 38, thereby closing the main valve assembly 22. If leakage between the parts 36 and 38 should permit buildup of pressure at the outlet 28 and in the chamber 66, the end 58 of the lever 54 limits upward movement of the relief valve head 52, so that overpressure below the diaphragm 44 lifts it away from the rim 110 against the spring 100 to permit flow of gas from the chamber 66 throught the aperture 92, into the space 112 and passed the flapper valve 116 to the vent connection 114 to relieve the pressure buildup in the chamber 66.

In the event of failure of the lever 54 or its connection at 60 to the relief valve head 52, or its connection 62, 64, with the stem 40, overpressure in the chamber 66 below the diaphragm 44 lifts the relief valve head 52 with the diaphragm 44 and stiffener 96 until the annular cup 88 engages the surface 75 on the underside of the bonnet 46. This acts as a stop to limit further overtravel of the relief valve head 52 in the upper direction, so that pressure under the diaphragm 44 acts to move the diaphragm 44 and the stiffener 96 against the force of the relief valve spring 100, thereby venting the chamber 66 through the vent connection 114, as described previously.

Another condition which could occur is the increase in inlet pressure which if permitted through a fault or failure of the main valve assembly 22 to be delivered to the outlet side of the pressure regulator 20, would cause an excessive buildup of outlet pressure which is forestalled in the present invention through the use of the improved inlet orifice device 30 which acts to limit the flow rate passing therethrough. FIG. 6 is a diagrammatic representation of one form of operation of the present invention, wherein one of any number of conditions has occurred to require the relief valve assembly 50 to become operative wherein the diaphragm 44 has been raised from the rim 110 to permit the flow of gas from the chamber 66 through the aperture 92 into the space 112 for venting. The relief valve head 52 as illustrated in FIG. 6, is prevented from rising with the diaphragm 44 by the lever 54 and connected valve stem 40. Of course, if the valve linkage means which inclides the valve stem 40 and the lever 54 were broken or nonoperative, the relief valve assembly 50 would automatically operate upon the posts 90 contacting the undersurface 75 of the bonnet 46 as explained hereinbefore. In any event, the increase inlet pressure is throttled by the coaction of the flow limiter poppet 176 and flow limiter nozzle 156, in the flow limiter area F so as effectively to limit the thruput flow passing the inlet orifice device 30, whose flow rate in such situations will be matched to that of the relief valve assembly 50, so as to keep the outlet pressure from building up and exceeding a safe value.

In the embodiment of the invention illustrated in FIG. 8, another preferred form of the improved inlet orifice device, generally designated 30a, is shown in the same position as was shown previously for the inlet orifice device 30 of FIG. 4. The suffix "a" is used to indicate components corresponding to the invention described in connection with FIGS. 1 – 7. It will be understood that the inlet orifice device 30a will be used in a pressure regulator of the same type as pressure regulator 20, having a transverse wall 32a in which it will be threadedly connected as at 196 to a housing 198 which carries the orifice body 138a in axially slidable sealing engagement therein. The orifice body 138a has a central orifice 38a, the end of which is operatively associated with the valve disc 36 of the main valve assembly 22 in the same manner as described hereinbefore. The orifice 38a has a section 166a of the uniform diameter which extends from the end adjacent the disc 36 to a flared section 168a of increasing cross-sectional area in the direction away form the disc 36. A flow limiter poppet 176a is affixed to the body 138a by means of a plurality of legs 178a having fingers 186a and 188a snap-fitted about flange 174a and depending into annular groove 170a, an O ring 152a is positioned between a pair of radially outwardly extending annular flanges 200, to slidingly seal the orifice body 138a with respect to the housing 198. The housing 198 has an inwardly turned flange 202 formed at the end adjacent the disc 36 and is fitted with the flow limiter nozzle 156a at the opposite end thereof. A coil spring 162a is disposed between flanges 200 and and 202 to normally urge the orifice body 138a in the leftward direction as viewed in FIG. 8. The conical surface 180a coacts with the flow limiter nozzle 156a to define a passage 190a in communication with the orifice 38a.

In any event, the improved inlet orifice device 30a will operate in substantially the same way as was described hereinbefore, for the inlet orifice device 30, and produce the same advantages thereof. By means of the threaded connection of the housing 198 to the wall 32a, the connection of the inlet orifice device 30a might be likened to the connection of the conventional orifice. The threaded connection at 196 would enable the inlet orifice device 30a to be retrofitted for use in any conventional pressure regulator, especially those having safety release valves therein. In fact the capacity of the safety release valve of the conventional regulator could be matched to the thruput flow rate of a given inlet orifice device 30a to produce the same advantages as that described hereinbefore under the invention ser forth in FIGS. 1 – 7. The same consideration could be given to the spring rate for the coil spring 162a, so as to insure obtaining the design paramaters for a given retrofitted conventional pressure regulator.

It will be understood that various changes in the details, materials, arrangements of parts and operating conditions which have been herein described and illustrated in order to explain the nature of the invention, may be made by those skilled in the art within the principles and scope of the invention.

Having thus set forth the nature of the invention, what is claimed herein is:

1. A pressure regulator operative responsive to inlet pressure and outlet pressure comprising:
   a. a housing having an inlet, an outlet in communication with the inlet and a chamber formed on the outlet side,
   b. a flexible diaphragm having one side in communication with the outlet connected in the chamber,
   c. a valve means having a valve operatively actuated by the diaphragm to shift the valve toward or away from the inlet responsive to the pressure in the chamber,
   d. a control means movably connected in the housing to limit the thruput flow from the inlet to the outlet responsive to the inlet pressure,
   e. the control means includes a body having an orifice therethrough to communicate the inlet and the outlet,
   f. an inlet piston carried by the body to urge the body to move towards the outlet responsive to increases in inlet pressure, and
   g. a nozzle carried by the housing disposed about the inlet piston and to coact therewith to limit the inlet thruput flow.

2. The combination claimed in claim 1 wherein:
   a. the body is movable responsive to inlet pressure to vary the throttling area between the orifice and the valve to decrease the inlet thruput flow through the regulator responsive to increased inlet pressure.

3. The combination claimed in claim 2 wherein:
   a. the body has a predetermined travel responsive to inlet pressure to vary the throttling area,
   b. a nozzle is a fixed area,
   c. the inlet piston is of variable area and carried on the body in spaced relation to the fixed nozzle to define a flow limiter area variable in size to decrease to a minimum opening corresponding to movement of the body as the inlet pressure increases.

4. The combination claimed in claim 3 wherein:
   a. a first abutment means is carried by the housing,
   b. a second abutment means is carried by the body to engage the first abutment means upon predetermined travel of the body to prevent overtravel thereof.

5. A pressure regulator operative to deliver a gas at a substantially constant outlet pressure, which gas has a variable inlet pressure, said regulator comprising:
   a. a housing having an inlet, an outlet and a transverse wall therebetween,
   b. a flexible diaphragm mounted in the housing and having one side in communication with the outlet pressure,
   c. an inlet orifice means carried by the transverse wall and movable relative thereto, and having an orifice therein to communicate the inlet with the outlet,
   d. a regulator valve actuated responsive the diaphragm to be shifted toward and away from the orifice responsive to the outlet pressure,
   e. a relief valve of predetermined capacity mounted in the housing, and operative at a predetermined outlet pressure,
   f. the inlet orifice means having a variable inlet area set to decrease upon increase of inlet pressure above a fixed level selectively to limit the thruput flow to a maximum value not exceeding the capacity of the relief valve means, whereby outlet pressure will not build up or exceed a safe value,
   g. the inlet orifice means including a body with an orifice extending therethrough,
   h. an orifice piston formed within the orifice to move the body responsive to inlet pressure,
   i. a body piston carried by the body to move the same responsive to increases in inlet pressure, and
   j. a nozzle means carried by the housing to coact with the body piston to form a variable inlet flow area which decreases responsive to increases in inlet pressure to control the inlet thruput flow in the inlet orifice means.

6. The combination claimed in claim 5 wherein:
   a. the inlet flow area defined by the body piston and the nozzle to be greatest at low inlet pressure and smallest at high inlet pressure to control the inlet thruput flow through the inlet orifice means.

7. The combination claimed in claim 6 wherein:
   a. stop means formed on the body to engage the housing upon predetermined travel of the body in one direction of travel.

8. The combination claimed in claim 5 wherein:
   a. the body having a pair of stop means formed in axially spaced relationship to each other,
   b. the housing having a projection intermediate the stop means to contact one or the other of the stop means upon the body travelling a predetermined distance in one or the other directions.

* * * * *